June 23, 1925.  1,543,065
L. F. DOUGLASS
METHOD OF MASKING PHOTOGRAPHIC FILM WHILE EXPOSURE IS BEING MADE
Original Filed July 15, 1922
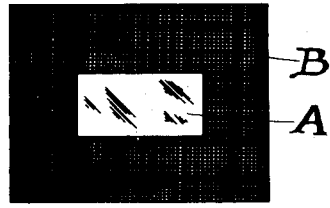
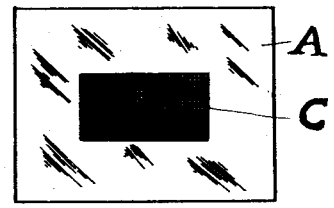
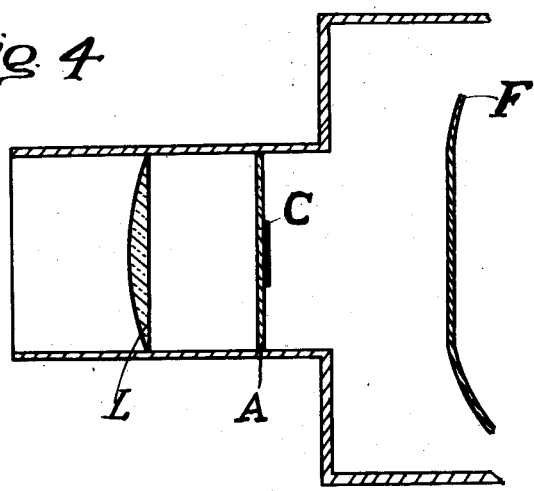
INVENTOR
Leon F. Douglass.
BY
ATTORNEY Patented June 23, 1925.

1,543,065

UNITED STATES PATENT OFFICE.

LEON F. DOUGLASS, OF MENLO PARK, CALIFORNIA.

METHOD OF MASKING PHOTOGRAPHIC FILM WHILE EXPOSURE IS BEING MADE.

Original application filed July 15, 1922, Serial No. 575,310. Divided and this application filed January 12, 1923. Serial No. 612,242.

*To all whom it may concern:*

Be it known that I, LEON F. DOUGLASS, a citizen of the United States, residing at Menlo Park, in the county of San Mateo and State of California, have invented new and useful Improvements in the Methods of Masking Photographic Film While Exposure Is Being Made, of which the following is a specification.

This invention relates to the method of masking photographic film in a camera, and particularly pertains to the use of a masking means when exposing a negative film in a camera.

An object of this invention is to provide a convenient method for producing a plurality of scenes on a negative film.

The invention is illustrated in the accompanying drawings, in which:—

Fig. 1 is an elevation view showing the clear glass together with an opaque member attached thereto;

Fig. 2 is a similar view of the clear glass together with an opaque member of different shape attached thereto;

Fig. 3 is a diagrammatic fragment of a photographic film upon which are two separate scenes, produced by means of the clear glass and opaque members shown in Figs. 1 and 2; and Fig. 4 is a sectional view of a portion of a camera showing the relative arrangement of the camera lens, the clear glass, an opaque member, and the negative film.

Referring to the drawings, A is a rectangular piece of clear glass or transparent support, which is so proportioned that it fits within a camera and covers one frame of a photographic film. B and C are opaque members, made from black cloth or any suitable material which will not permit light rays to pass through it. B and C are attached to A by means of glue or any other suitable adhesive, and are placed thereon in such a manner that the portion of the film upon which no exposure is to be made, is masked thereby.

When two separate scenes or images are to be produced on a negative film, the opaque members B and C are so formed or shaped that one exactly fits within the other, as shown in Figs. 1 and 2. Thus when two particular scenes are to be produced on negative film F, the clear glass A and the opaque member C, are positioned within the camera structure immediately in front of film F, just behind the camera lens L, as shown in Fig. 4. The light rays coming from the particular scene to be photographed, proceed through lens L and such portions of clear glass A that are not covered by opaque member C, to film F. After the negative film is thus exposed to the light rays, C is removed from clear glass A, and B placed thereon in such a position that the latter covers the surface of the clear glass A except for the portion thereof previously covered by C. The clear glass A and opaque member B are then inserted within the camera structure as before. The negative film F is then rewound, placed in exactly the same position as it was formerly in, and exposed to the light rays proceeding from a different scene. The said light rays will then strike portions of the film not masked by B. The light rays, on the second exposure, proceed to the negative film F, except for the portion masked by B, thus producing on the portion thereof previously masked by C, another scene. The negative film F after both exposures, has on it two entirely different scenes, one within the other.

It is to be understood that I am not limited to any particular kind of clear glass for the attachment of the opaque members, as the same satisfactory results can be accomplished by using a transparent celluloid, upon which can be photographed the opaque members. Therefore the term "clear glass" is to be construed as applying to both transparent celluloid and glass and "opaque members" is to be construed as applying to any substance or material of any shape, which will not permit light rays to pass through it.

It is to be expressly understood that I am not limited to any particular kind or form of photography, as it is apparent that my invention may be used in connection with both still and motion photography or cinematography.

This application is a division of my application Serial No. 575,310, filed July 15, 1922, which matured into Patent No. 1,508,509, granted September 16, 1924, entitled Method of masking photographic film while exposure is being made, wherein I claimed in general the method of masking film; this application is specifically directed to the method of masking film in a camera when exposure is being made to separate scenes.

Having described my invention, what I claim is:

1. The method of producing two separate images on a negative film which comprises, attaching an opaque member of particular shape to a transparent support adapted to cover one frame of a negative film, placing the opaque member and transparent support in the path of the light rays proceeding through a camera lens from an object to be photographed to a negative film located inside the said camera, making an exposure of said negative film to the light rays passing through the transparent support, removing the opaque member from the transparent support, and attaching thereto another opaque member adapted to mask the portion of the transparent support not masked by the first mentioned opaque member, interposing the last mentioned opaque member and transparent support in the path of the light rays proceeding from another object through said camera lens to said film, and making another exposure of said film to the light rays passing through the transparent support.

2. The method of producing two separate scenes on a negative film which comprises, firstly masking portions of a negative film located in a camera by means of an opaque member of particular shape supported by a transparent member and exposing the unmasked portion of a negative film to the light rays passing through the lens of the camera to the film from a scene to be photographed, and secondly, masking the portion of the negative film previously exposed, by means of an opaque member of another particular shape supported by the transparent member, and exposing the negative film to the light rays passing through the transparent support from another scene to be photographed.

3. The method of producing two separate images on a negative film which comprises inserting an opaque member of particular shape supported by a transparent member within a camera between the camera lens and a negative film, exposing the negative film to the light rays proceeding through the transparent support from a scene to be photographed, substituting for the first mentioned opaque member another opaque member adapted to cover the transparent support not covered by the first mentioned opaque member, inserting the transparent support and opaque member within the camera between the camera lens and the said negative film, and exposing the portions of the negative film not previously exposed, to the light rays proceeding through the transparent support from another scene to be photographed.

LEON F. DOUGLASS.